United States Patent
Liu et al.

(10) Patent No.: US 12,534,048 B1
(45) Date of Patent: Jan. 27, 2026

(54) EFFICIENT THERMAL REGULATION AND/OR CLEANING OF VEHICLE SENSORS

(71) Applicant: Zoox, Inc., Foster City, CA (US)

(72) Inventors: Da Liu, Milpitas, CA (US); Daniel Glenn Johnson, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 673 days.

(21) Appl. No.: 17/553,601

(22) Filed: Dec. 16, 2021

(51) Int. Cl.
  *B60S 1/48* (2006.01)
  *B60S 1/54* (2006.01)
  *B60S 1/56* (2006.01)

(52) U.S. Cl.
  CPC .............. *B60S 1/488* (2013.01); *B60S 1/481* (2013.01); *B60S 1/54* (2013.01); *B60S 1/56* (2013.01)

(58) Field of Classification Search
  CPC .. B60S 1/488; B60S 1/481; B60S 1/54; B60S 1/56
  USPC .......................................................... 134/123
  See application file for complete search history.

(56) References Cited

U.S. PATENT DOCUMENTS

2019/0106085 A1* 4/2019 Bacchus ............ G02B 27/0006
2019/0322245 A1* 10/2019 Kline .................... B60S 1/0848

FOREIGN PATENT DOCUMENTS

CN      112550229 A  *  3/2021  ............... B08B 3/02

OTHER PUBLICATIONS

CN112550229A—machine translation (Year: 2021).*

* cited by examiner

*Primary Examiner* — Tinsae B Ayalew
(74) *Attorney, Agent, or Firm* — Lee & Hayes, P.C.

(57) ABSTRACT

This application relates to techniques for improving sensor cleaning techniques. The techniques described herein utilize heat generated by multiple heat generating components of a vehicle, which is normally wasted. The techniques collect the waste heat to heat fluid stored in a reservoir. The heated fluid is further dispensed to heat and/or clean sensors. In some examples, a vehicle implementing the techniques includes a computing system to control an operation of the vehicle; a sensor to sense an environment of the vehicle; and a sensor cleaning system to clean the sensor with a fluid. In implementations, the sensor cleaning system includes a heat exchanger to apply heat generated by a heat generating component to heat fluid in a reservoir to generate heated fluid, and a dispenser fluidly coupled to the reservoir and configured to dispense the heated fluid toward the sensor to heat or clean the sensor.

20 Claims, 6 Drawing Sheets

EFFICIENT THERMAL REGULATION AND/OR CLEANING OF VEHICLE SENSORS

BACKGROUND

Many vehicles today include sensors to assist operation of the vehicle. Such sensors may be mounted to an exterior of a vehicle to sense the surroundings of the vehicle, such as on a roof of the vehicle. If these sensors become obstructed by dirt, debris, or other obstructions, the sensors may be unable to accurately sense the surroundings of the vehicle. Existing systems may be inadequate to remove obstructions from sensors in some circumstances. Additionally, the sensors may be designed to operate within a certain temperature range. Existing systems to clean sensors and/or maintain sensors within a desired temperature range consume electrical energy, thus reducing an effective range of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
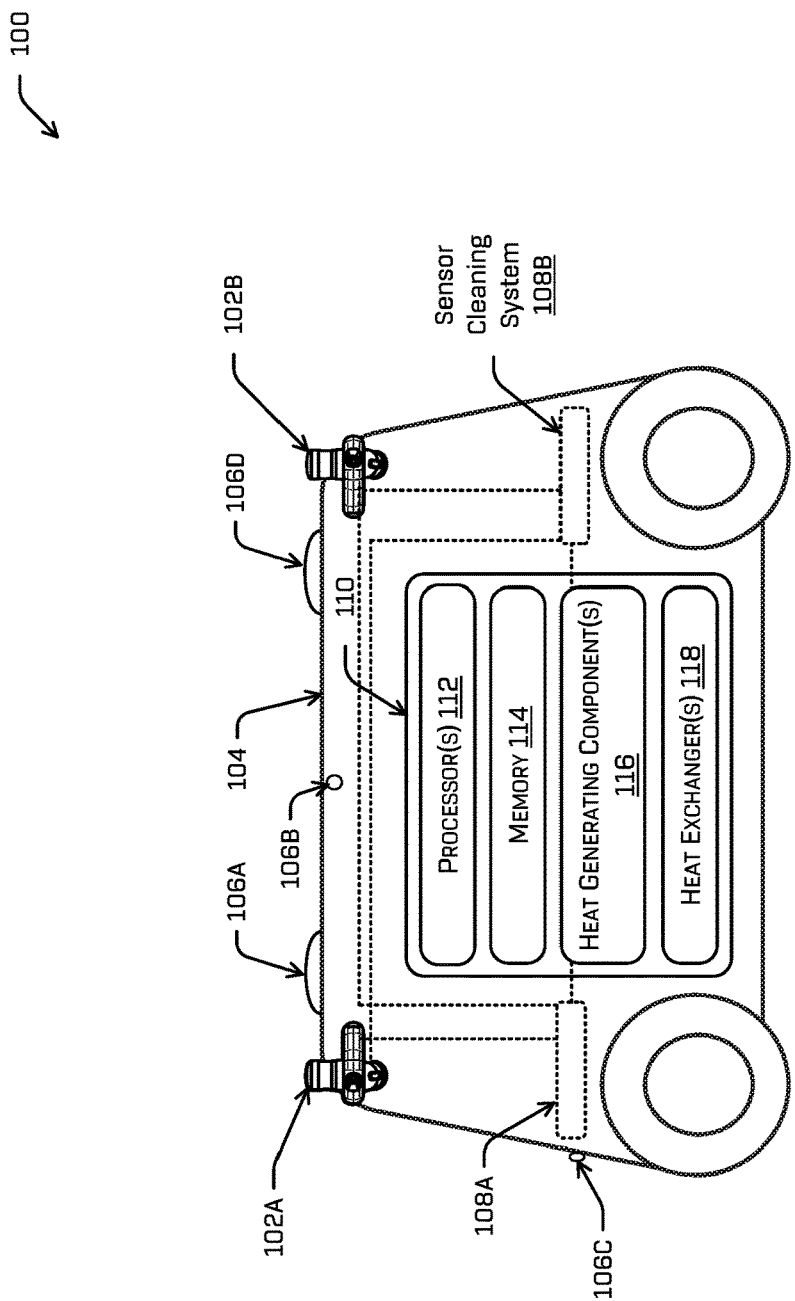
FIG. 1 is an illustration of an example vehicle having one or more sensors to collect and provide data to the vehicle, in accordance with the present disclosure.

As discussed above, conventional sensor cleaning systems may be inadequate to remove certain types of sensor obstructions. Additionally, existing sensor cleaning and thermal management systems utilize electrical energy to remove sensor obstructions. For electric vehicles or other battery powered systems, the electrical power consumed by sensor cleaning and thermal management systems directly affects the driving range of the vehicle or system, Therefore, this application describes a more effective and energy efficient sensor cleaning system to clean sensors of the vehicle or other system.

This application relates to structures and techniques for improving sensor cleaning techniques. In some examples, the vehicle sensor cleaning system may capture the heat generated by one or more heat generating components of the vehicle. The heat may be heat that would otherwise normally be wasted, e.g., vented to an exterior of a vehicle via a radiator. In examples, this waste heat can be diverted to, instead, heat the sensors and/or cleaning fluid used to clean the sensors, thus reducing electrical energy consumption for sensor cleaning or defrosting. By way of example and no limitation, the one or more heat generating components may include a computing system, a component of a powertrain of the vehicle (e.g., one or more electric motors, combustion engines, etc.), a power source of the vehicle (e.g., one or more batteries, fuel cells, capacitors, etc.), a power regulator of the vehicle, a braking system of the vehicle, surfaces of the vehicle subject to solar load, a charging system of the vehicle, a heating ventilation air conditioning (HVAC) system of the vehicle, individual components of any of these systems, etc. In the case of an autonomous vehicle, for example, a computing system used to process the vast amounts of sensor data and to control operation of the autonomous vehicle can generate substantial amounts of heat. This application describes techniques for capturing this and other waste heat of a system for use in cleaning and/or controlling a temperature of one or more sensors of the system.

In some examples, a heat exchanger may be implemented to capture the heat from one or more heat generating components. The heat exchanger may further transfer the heat to one or more fluid reservoirs to heat the fluid stored therein for use in heating and/or cleaning the sensors. In some examples, the sensor cleaning system may include multiple different fluid reservoirs, such as one or more first reservoirs (e.g., for holding water, detergent, or other liquid cleaning agent) and/or one or more second reservoirs (e.g., for holding compressed air or other gas). Some or all of the multiple reservoirs may be heated by a same/common heat exchanger, or individual reservoirs may be heated by individual heat exchangers.

In some examples, a single heat exchanger may supply beat to one or more air reservoirs and one or more liquid reservoirs. The sensor cleaning system may include multiple valves, thermostats, sensor, and/or other components to regulate the amount of heat supplied to each reservoir. In other examples, the vehicle may comprise multiple heat exchangers disposed on various places within the vehicle body or coupled to the vehicle body. Each individual heat exchanger may transfer the captured heat to a corresponding fluid reservoir.

In some examples, the heat exchanger may be coupled to the reservoir and is separate from the reservoir. In other examples, the heat exchanger and the reservoir may be formed integrally and serve to heat the fluid in the reservoir. An integral heat exchanger and reservoir unit can include functionality to selectively divert fluid to a radiator portion or a reservoir portion to selectively dissipate heat or heat fluid contained in the reservoir. In examples, the integral unit may also include functionality to cool liquid in the reservoir (e.g., by diverting liquid contained therein to the reservoir portion). Integrating the heat exchanger with the reservoir can improve packaging, reducing space required for these components and make also reduce heat lost in routing liquid between separate components.

In some examples, the sensor cleaning system may detect the temperature of one or more of the individual sensors and/or the environment. In some examples, the sensors may be individually mounted on the exterior of the vehicle body or coupled to a sensor pod. If the temperature of an individual sensor or the environment is equal to or less than a first threshold, the sensor cleaning system may instruct the air reservoir to dispense the heated air to heat the sensors. Alternatively, or additionally, the sensor cleaning system may instruct a water pump to dispense the heated cleaning liquid stored in the liquid reservoir to heat and/or clean the sensors. In some examples, the sensor cleaning system may perform one or more additional or alternative mitigating actions to clean one or more sensors, such as dispensing cool cleaning fluid (e.g., air and/or liquid), actuating a heater associated with the respective sensor (e.g., a resistive heater within or coupled to a housing of the respective sensor), activating a vibratory actuator (e.g., to vibrate the respective sensor, sensor housing, sensor mount, lens, or other portion of the sensor), using a mechanical cleaning element (e.g., a wiper, scraper, etc.), or any other mitigating action.

In some examples, the sensor cleaning system may divert the heat generated by the heat generating component based on various environmental and/or the heat generating component conditions. For instance, the sensor cleaning system may wait to capture heat from the heat generating component until the heat generating component reaches a first threshold operating temperature (e.g., a minimum operating temperature). As another example, the sensor cleaning system may capture and divert heat from the heat generating component more frequently and/or at a higher rate when the temperature of the heat generating component is above a second threshold temperature (e.g., a peak operating temperature), or when the environment is above a third threshold temperature.

In some examples, the sensor cleaning system may additionally or alternatively be used to cool one or more sensors. For instance, the sensor cleaning system may detect that a sensor is at or above a second threshold temperature. By way of example and not limitation, a sensor (e.g., a lidar sensor, a time-of-flight sensor, a camera, a radar sensor, a sonar sensor, etc.) may get overheated after a period of activation and/or during use in a hot environment and/or in direct sunlight. The sensor cleaning system may active the heat exchanger to circulate the cleaning fluid (e.g., air or liquid) through a cooling block, a cooling loop, or other cooling system to cool the temperature of the cleaning fluid. In some examples, the cool cleaning fluid may be stored in one or more separate reservoirs. The sensor cleaning system may further activate the air reservoir to dispense the cool cleaning fluid toward to the sensor to regulate the temperature.

In some examples, the sensor cleaning system may detect an obstruction on the sensing surface of the sensor. In instances, the obstruction can be frost or ice caused by the cold temperature and/or humidity of the environment. In instances, the obstruction can be rain, frost, or other condensation. In instances, the obstruction can be any types of dust or dirt, such as, bird droppings, pulps from trees or plants, bugs, heavy dust from a construction site, etc. In instances that the obstruction is frost or ice, the sensor cleaning system may perform a first mitigation action based on the type of the obstruction and the conditions of the environment (i.e., temperature and/or humidity), such as dispensing heated air and/or liquid to heat and/or clean the sensor. In instances that the obstruction is rain or condensation, the sensor cleaning system may perform a second mitigation action, such as activating the heater and/or dispensing heated air to clean the sensor. In instances that the obstruction is dirt or contaminant, the sensor cleaning system may perform a third mitigation action, such as vibrating the sensor, sensor housing, other portion of the sensor, and/or dispensing cool or heated liquid to clean a sensor. The third mitigation action may also include using a mechanical cleaning element, such as a wiper, scraper, etc. In some examples, one or more mitigating actions may refrain from using heated air and/or liquid to avoid baking the contaminant onto the surface of the sensor.

In some examples, the sensor cleaning system may be configured to heat cleaning fluids to different temperatures depending on the types and/or materials of sensors to which the cleaning fluid is to be applied and/or based on the environmental conditions. For example, the sensor cleaning system may be configured to heat the cleaning fluid to a temperature based on an environmental temperature and/or a temperature of the sensor to avoid a avoid large temperature differentials between the temperature of the cleaning fluid and the sensor to which the cleaning fluid is applied (e.g., to avoid stresses that could be imparted by such large temperature differentials that could cause damage to the sensor, sensor housing, and/or lenses). In that case, temperature of the cleaning fluid may be regulated (heated or cooled) to a temperature that differs from the environmental temperature and/or the temperature of the sensor by at most a threshold temperature difference. In some examples, certain sensors may be capable of withstanding higher temperatures of than others. In that case, the sensor cleaning system may regulate temperature of the cleaning fluid based at least in part on a type of sensor and/or a material of which the sensor, sensor housing, and/or lenses are made. That is, the temperature of the cleaning fluid may be regulated (heated or cooled) to a temperature that is within a range of suitable temperatures for application to a sensor of a particular type (e.g. lidar, radar, camera, time of flight, sonar, etc.), a particular model of sensor, and/or a particular material (e.g., metal, plastic, glass, specific alloys or polymers thereof, etc.) of a lens, housing, or other component of the sensor. In some examples, the sensor cleaning system may include multiple different reservoirs to hold the cleaning fluid at different temperatures. In some examples, the sensor cleaning system may be configured to heat the cleaning fluid to the specified temperature "on demand" just prior to being dispensed toward the sensor(s).

It should be understood that the mitigating actions described above are merely for the illustrative purpose. The sensor cleaning system may use multiple other combinations of mitigation actions to clean the sensors.

FIG. 1 is an illustration of an example vehicle having one or more sensor pods to collect and provide data to the vehicle, in accordance with an example of the present disclosure.

The vehicle shown in FIG. 1 may be a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some examples, the vehicle may be a fully or partially autonomous vehicle having any other level or classification. In some other examples, the energy management structures described herein may be applicable to non-autonomous and/or non-bidirectional vehicles as well. Also, while examples are given in which the vehicle is a land vehicle, the techniques described herein are also applicable to aerial, marine, and other vehicles. Still further, the sensor cleaning techniques described herein are not limited to use on vehicles and may also be applicable to manufacturing systems, robotic systems, or any other system that includes one or more heat generating components and one or more sensors that need to be cleaned and/or thermally regulated.

As illustrated in FIG. 1, the vehicle 100 may include a first sensor pod assembly 102A and a second sensor pod assembly 102B (collectively "sensor pod assemblies 102") coupled to a body 104. In addition to the sensor pod assemblies 102, the vehicle 100 may also include a first individual sensor 106A, a second individual sensor 106B, a third individual sensor 106C, and a fourth individual sensor 106D (collectively "individual sensors 106") coupled to the body 104. In some examples, the vehicle 100 may include a first sensor cleaning system 108A and a second sensor cleaning system 108B (collectively "sensor cleaning system(s) 108") to clean the sensors in the sensor pod assemblies 102 and/or the individual sensors 106.

Each of the sensor pod assemblies 102 in this example include multiple sensors in different types. For example, the first sensor pod assembly 102A may include one or more front cameras, a side camera, a top light detection and ranging (LIDAR) sensor, and a bottom LIDAR sensor. The second sensor pod assembly 102B may include one or more rear cameras, a side camera, a top lidar sensor, and a bottom lidar sensor. The individual sensors 106 may include one or more of radar sensors, long wavelength infrared (LWIR) sensors, cameras, etc.

The vehicle 100 in this example includes one or more computing systems 110 to control operation of one or more modules of the vehicle 100. For example, in an autonomous vehicle, the computing system(s) 110 may include one or more processor(s) 112 and memory 114 communicatively coupled with the one or more processor(s) 112 and may be configured to control the vehicle 100 to, among other things, receive and process sensor data from one or more sensors and to plan a route for the vehicle through an environment.

In some examples, the computing system 110 may also include one or more heat generating components 116 (collectively "heat generating component(s) 116") configured to provide heat to clean and/or heat the sensor pod assemblies 102 and/or the individual sensors 106. In some examples, the heat generating component(s) 116 may be coupled to one or more heat exchangers 118 (collectively "heat exchanger(s) 118") for thermal regulation and control.

The heat generating component(s) 116 may be any systems, modules, parts of the vehicle 100 that can generate heat. For example, the computing system(s) 110 may be a heat generating component. In some examples, the heat generating component(s) 116 may include a heating ventilation air conditioning (HVAC) system of the vehicle, a powertrain of the vehicle, a power source of the vehicle, a charging system of the vehicle, etc. The powertrain of the vehicle can include one or more of electric motors, combustion engines, or hybrid propulsion systems. The power source of the vehicle can include one or more of batteries, fuel cells, or capacitors.

In some examples, the sensor cleaning system(s) 108 may comprise one or more fluid reservoirs (not shown in FIG. 1) to store the fluid for heating, cooling, and/or cleaning the sensors. in some examples, the sensor cleaning system(s) 108 may comprises a closed loop system that is fluidically isolated from the H VAC or other cooling system of the vehicle. However, in other examples, the sensor cleaning system(s) 108 may be fluidically coupled to the HVAC system and fluid may be diverted from a radiator or other component of the HVAC or cooling system to heat the fluid reservoir(s). The heat exchanger(s) 118 may be coupled to the fluid reservoir(s) and configured to provide the heat generated by the heat generating component(s) 116 to the fluid reservoir(s) to control the temperature of the fluid used to clean and/or regulate the temperature of the sensors. In some examples, the fluid reservoir(s) may include an air reservoir that stores compressed air and/or a liquid reservoir that stores a cleaning liquid. The heat exchanger(s) 118 may be thermally coupled to the fluid reservoir(s) by being positioned in close proximity, adjacent to one another, contacting one another, diverting fluid from the heat exchanger(s) 118 or other vehicle system (e.g., HVAC system, cooling system, radiator, etc.) to heat the fluid reservoir(s), or the like. In some examples, a surface area of the coupling may be maximized to increase a rate at which heat can be transferred between the heat exchanger(s) and the reservoir(s). In some examples, one or more thermal transfer features (e.g., cooling fins, coils, heat skink, etc.) may be used to promote effective heat transfer from the heat exchanger(s) 118 to the fluid reservoir(s). In some examples, a thermal interface material (TIM) may be used to increase a thermal conductivity between the he heat exchanger(s) and the reservoir(s). In some examples, a portion of one or more of the heat exchangers may pass through an interior of one or more of the reservoirs, or vice versa, to promote heat transfer between the heat exchanger(s) and the reservoir(s). Further, in some examples, heat may be transferred directly from the heat generating component(s) 116 of the system to the fluid reservoir(s) using any one or a combination of the heat transfer techniques and structures described herein.

In some examples, the vehicle 100 may comprise multiple sensor cleaning system(s) 108, each of which is coupled to one or more of the sensor pod assemblies 102. In the illustrated example, the first sensor cleaning system 108A is coupled to the first sensor pod assembly 102A, and the second sensor cleaning system 108B is coupled to the second sensor pod assembly 102B. Although not shown in FIG. 1, in some other examples, the sensor cleaning system(s) 108 may also supply the fluid stored in the fluid reservoir(s) to heat and/or clean the individual sensors not housed in the sensor pod assemblies 102 (e.g., the individual sensor 106A, 106B, 106C, and 106D). For example, the fluid may be supplied to individual sensor 106C though the grill structures at the front end or the rear end of the vehicle. In some examples, the grill itself may include integral passages to transfer fluid from one or more of the reservoir(s) to one or more sensors disposed in or on or mounted to the grill. In another example, the fluid may be supplied to individual sensor 106A, 106B, and 106D through one or more passages coupled to fluid reservoir(s). In yet other examples, the multiple sensor cleaning systems may act as backup systems to each other. In some examples, the sensor cleaning system(s) 108 may be located within the body 104. In some other examples, the sensor cleaning system(s) 108 may be disposed within a detachable portion of the vehicle 100, for example, a drive module.

In the illustrated example, the vehicle 100 is an autonomous vehicle; however, the vehicle 100 could be any other type of vehicle, such as a semi-autonomous vehicle, or any other system having at least an image capture device (e.g., a camera enabled smartphone). Though depicted in FIG. 1 as residing in the body 104 for illustrative purposes, it is contemplated that the computing systems 110 be accessible to the vehicle 100 (e.g., stored on, or otherwise accessible by, memory remote from the vehicle 100, such as, for example, on memory of a remote computer device). In some examples, multiple computing systems 110 may be included on the vehicle 100. In some examples, computing systems 110 may be located within the body 104, a drive assembly, or combinations thereof.

The processor(s) 112 of the vehicle 100 may be any suitable processor capable of executing instructions to process data and perform operations as described herein. By way of example and not limitation, the processor(s) 112 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 114 is an example of non-transitory computer-readable media. Memory 114 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, memory 114 may include at least a working memory and a storage memory. For example, the working memory may be a high-speed memory of limited capacity (e.g., cache memory) that is used for storing data by the processor(s) 112. In some instances, memory 114 may include a storage memory that may be a lower-speed memory of relatively large capacity that is used for long-term storage of data. In some cases, the processor(s) 112 cannot operate directly on data that is stored in the storage memory, and data may need to be loaded into a working memory for performing operations based on the data, as discussed herein.

Figure 2:
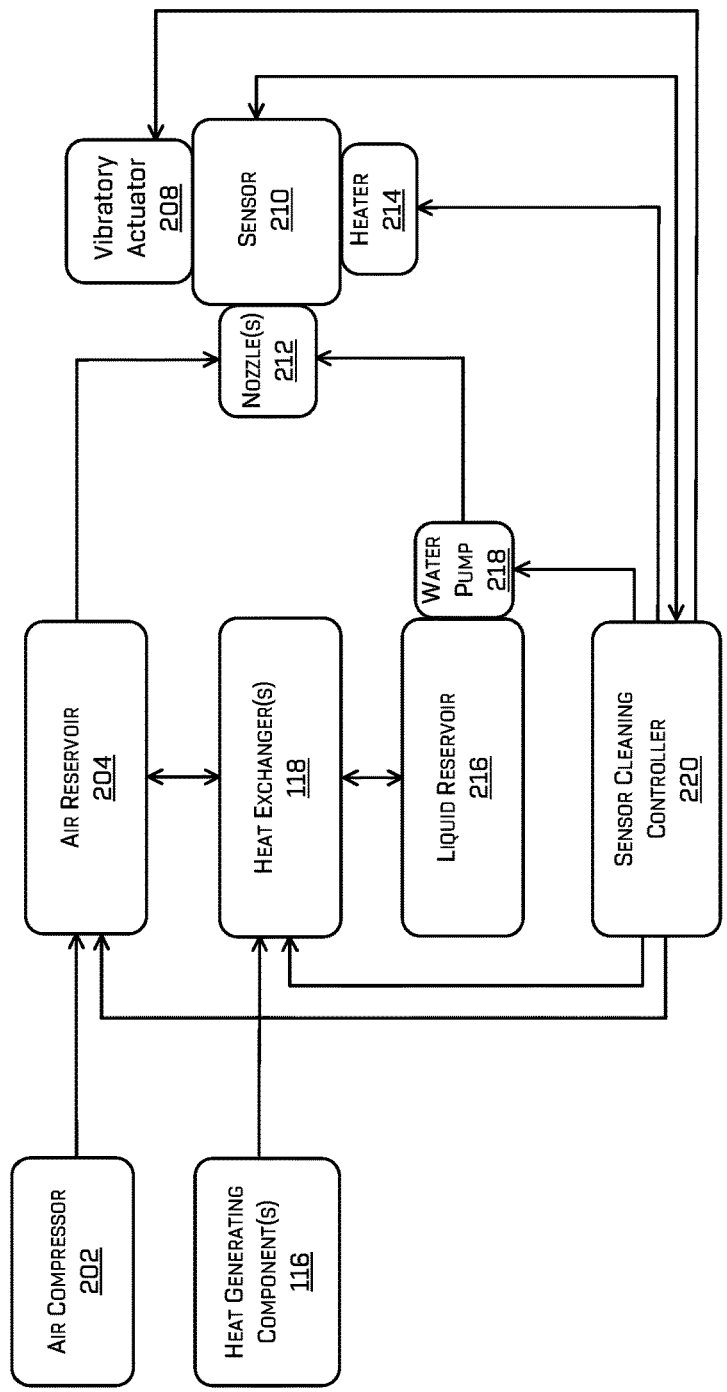
FIG. 2 is a block diagram illustrating an example sensor cleaning architecture, in accordance with the present disclosure.

FIG. 2 is a block diagram illustrating an example sensor cleaning system 200, in accordance with the present disclosure. The sensor cleaning system 200 may represent or include the sensor cleaning system(s) 108, one or more of the sensor pod assemblies 102, and/or the individual sensors (e.g., 106A, 106B, 106C, and 106D), as illustrated in FIG. 1.

In the illustrated example, a sensor cleaning system 200 of a vehicle may include one or more fluid reservoirs to store the fluid. For example, the sensor cleaning system 200 may include an air reservoir 204 to store compressed air to heat, cool, and/or clean the sensor 210. In some examples, the sensor cleaning system 200 may also include an air compressor 202 to compress the air for storage in the air reservoir 204.

The sensor cleaning system 200 may detect an obstruction on a sensing surface of the sensor. In some examples, when the camera is obstructed by frost or ice on the respective lens, the images captured by the cameras may reflect a blurred view of the surroundings of the vehicle. In other instances, when the surface of the LIDAR sensor is covered with frost or ice, the ranging data provided by the LIDAR sensor may be inaccurate. When provided with such images and ranging data, the computing system of the vehicle may not have a true perception of the environment. The computing system of the vehicle may provide improper driving instructions, causing safety issues. The sensor cleaning system 200 may performing a first mitigating action based on the temperature and/or humidity related to the sensor and/or the environment, such as dispensing heated air stored in the air reservoir 204 onto the surface of the camera lens or the surface of the LIDAR sensor to remove the frost or ice.

In some examples, the obstruction on the sensing surface of the sensor 210 may be rain and/or condensation, the sensor cleaning system 200 may perform a second mitigating action, such as activating a heater 214 coupled to the sensor 210 to remove the rain and/or condensation. Alternatively, or additionally, the sensor cleaning system 200 may dispense heated air from the air reservoir 204 to remove the rain and/or condensation. In some examples, each sensor has a heater. In some other examples, only certain types of sensors (i.e., imaging sensors) are coupled with heaters. In some examples, the heaters are electrothermal heaters (e.g., resistance heaters) that convert electrical energy into heat. In some examples, a beater is couple between the sensor and the frame that the sensor is mounted to. In some examples, a heater associated with a sensor may be activated to reduce, eliminate, or aid in cleaning the sensor or maintaining a clean surface. For example, the heater may be used to reduce, eliminate, or aid in the removal of frost or ice that may affect the associated sensor. In some examples, the heater may be used in conjunction with one or more of the liquid cleaning fluids. For example, the heater may be triggered to increase the temperature of the sensor prior to the use of a liquid cleaning agent. In examples, the heater may preheat the sensor to reduce any cooling caused by the later application of liquid cleaning agent. In examples, the heater may increase the temperature of the sensor or sensing surface that may cause any residual liquid cleaning fluid or other environmental source to evaporate or flash off of the sensor and/or sensing surface.

In some example, the obstruction on the sensing surface of the sensor may be dirt or contaminant, the sensor cleaning system 200 may perform a third mitigating action, such as activating a vibratory actuator 208 coupled to the sensor 210 to clean the sensor 210. Alternatively, or additionally, the third mitigating action may further include using other mechanical cleaning elements (e.g., a wiper, scraper, etc.), dispensing cool liquid, or any combination thereof, to clean the sensor 210.

In some examples, the air in the air reservoir 204 and/or the liquid cleaning agent in the liquid reservoir 216 may be pre-stored and heated using the electric power of the vehicle. In some other examples, heat may be captured from the heat generating component(s) 116 of the vehicle and transferred to the air reservoir 204 for storage. The heat generating component(s) 116 can be any components of the vehicle that can generate heat. Any components or modules that utilize the electric power may generate heat. For example, the computing system of an autonomous vehicle consumes electrical energy to process the sensor data and to control the operation, which substantial amount of heat. In another example, traditional combustion engines, electric motors, or hybrid motors may also generate heat. The present disclosure utilizes the heat from the heat generating component(s) 116, which would otherwise normally be wasted, to heat and/or clean the sensor 210 to reduce the electrical energy consumption.

In some examples, the sensor cleaning system 200 may determine various temperatures and/or a temperature range of the compressed air with respect to various types of sensors and based on the environmental conditions. For example, the sensor cleaning system 200 may heat the cleaning fluid to a particular temperature or temperature range for the compressed air to be applied to an imaging sensor based on the environmental temperature. In other examples, the sensor cleaning system 200 may determine a temperature range for the compressed air to be applied to an imaging sensor based on the type of sensor, the model of sensor, and/or materials from which the lenses or other components of the sensor are made.

The heat exchanger(s) 118 may be thermally coupled to the air reservoir 204 and the liquid reservoir 216 by being positioned in close proximity, adjacent to one another, contacting one another, or the like. In some examples, a surface area of the coupling may be maximized to increase a rate at which heat can be transferred between the heat exchanger(s) 118 and the air reservoir 204 and the liquid reservoir 216. In some examples, a thermal interface material (TIM) may be used to increase a thermal conductivity between the heat exchanger(s) 118 and the air reservoir 204 and the liquid reservoir 216. In some examples, a portion of one or more of the heat exchanger(s) 118 may pass through an interior of one or more of the air reservoir 204 and the liquid reservoir 216, or vice versa, to promote heat transfer between the heat exchanger(s) 118 and the air reservoir 204 and the liquid reservoir 216.

In the illustrated example, the sensor cleaning system 200 of a vehicle may further include a sensor cleaning controller 220 configured to control the heating and/or cleaning process. The sensor cleaning controller 220 may be coupled to the heat exchanger(s) 118 and configured to control the heat exchanger(s) 118 to provide the heat to the compressed air stored in the air reservoir 204. As discussed herein, the heat generating component(s) 116, such as the computing system, the HVAC system, the propulsion system, and the power source generate heat while the vehicle is operating, and the charging circuits also generates heat while the vehicle is charging. In some examples, the heat is constantly captured by the heat exchanger(s) 118. In some examples, the sensor cleaning controller 220 may divert the heat after the heat generating component(s) 116 reaches a preset operating temperature. In other examples, the sensor cleaning controller 220 may divert the heat based on the conditions of the environment. The sensor cleaning controller 220 may detect the temperature of the compressed air in the air reservoir 204 and/or the temperature of the liquid in the liquid reservoir 216. If the temperature of the compressed air and/or the liquid is below a threshold, the sensor cleaning controller 220 may instruct the heat exchanger(s) 118 to provide the heat to the air reservoir 204 and/or the liquid reservoir 216 to regulate the temperature of the fluid. In some examples, the sensor cleaning system 200 may configure the temperatures and/or temperature ranges for heated and/or cool liquid cleaning agent to be applied to different types of sensors and based on the environment conditions (i.e., temperature, humidity, etc.).

In instances, an obstruction may be detected on the surface of the sensor 210, the sensor cleaning controller 220 may activate the water pump 218 to dispense liquid cleaning agent stored in the liquid reservoir 216 toward the sensor 210 to clean the obstruction. The temperature of the liquid cleaning agent may affect the cleaning effect. In instances, the temperature of the liquid cleaning agent may be below a threshold, causing difficulty to be dispensed from the liquid reservoir 216. The sensor cleaning controller 220 may activate the heat exchanger(s) 118 to apply the heat toward the liquid reservoir 216 to heat the liquid cleaning agent stored therein.

In some examples, the sensor cleaning system 200 may include one or more valves, thermostats, sensor, and/or other components to regulate the amount of heat supplied to each reservoir. Alternatively, and/or additionally, the sensor cleaning system 200 may include other multiple valves to direct the heat and/or fluid to the respective sensors. For example, the sensor cleaning system 200 may include an 8-way valve. The sensor cleaning controller 220 may control the operations of the water pump 218 and the valve to dispense the liquid cleaning agent to clean the sensors in the sensor pod assembly 102A, the individual sensor 106A, the individual sensor 106B, the individual sensor 106C, and the individual sensor 106D, respectively.

In some examples, the sensor cleaning controller 220 may receive, from a temperature sensor, temperature of the environment and/or the temperature associated with the sensor 210. The temperature sensor may be mounted on the body of the vehicle or coupled to the sensor 210. The sensor cleaning controller 220 may determine whether it is needed to heat the sensor 210 based on the temperature of the environment and/or the temperature associated with the sensor 210. In some examples, the sensor cleaning controller 220 may further determine a temperature level and/or a temperature range, to which the fluid will be heated for sensor heating and/or cleaning. Based on the temperature of the environment and/or the sensor, as well as the materials that the sensor and/or the sensing surface is made of, the sensor cleaning controller 220 may heat the liquid to an appropriate temperature. Alternatively, and/or additionally, certain types of sensors may get overheated after a period of activation and/or during use in a hot environment and/or in direct sunlight. The sensor cleaning controller 220 may active the heat exchanger(s) 118 to circulate the cleaning fluid (e.g., air or liquid) through a cooling block, a cooling loop, or other cooling system to cool the temperature of the cleaning fluid. In some examples, the cooled cleaning fluid may be stored in one or more separate reservoirs. The sensor cleaning controller 220 may further activate the air reservoir 204 and/or the liquid reservoir 216 to dispense the cool cleaning fluid toward to the sensor to regulate the temperature.

In examples, the sensor cleaning system 200 may further include one or more nozzle(s) 212 (collectively "nozzle(s) 212") configured to apply the air and/or the liquid cleaning agent to the surface of the sensor 210. The nozzle(s) 212 is coupled to the sensor 210 to direct the air and/or the liquid cleaning agent to the surface to the sensor 210 to remove the frost and/or to clean the surface. In instances, an imaging sensor or a camera may be coupled to dual nozzles. One of the dual nozzles may be configured to direct the heated air to the lens of the camera while another of the dual nozzles may be configured to direct the liquid cleaning agent to the lens of the camera. In some examples, a radial nozzle may be coupled to a LIDAR sensor and configured to apply the liquid to cool the temperature of the LIDAR sensor.

It should be understood that the elements shown in FIG. 2 are merely for illustrative purpose. The present disclosure is not intended to be limiting. The sensor cleaning system 200 may comprise multiple liquid reservoirs and/or multiple valves. The liquid cleaning agent stored therein may be the same fluid or may be different. For example, the liquid cleaning agent may be water, detergent, deicer, alcohol, or other liquid agents. To clean the dirt and/or contaminant on a camera lens, the sensor cleaning controller 220 may operate the corresponding pump to dispense the detergent toward the nozzle coupled to the camera. While to cool the temperature of a LIDAR sensor, the sensor cleaning controller 220 may operate the corresponding pump to dispense water toward the radial nozzle. The sensor cleaning system 200 may also comprise multiple air reservoirs to store the heated air captured from various parts of the vehicle.

Figure 3:
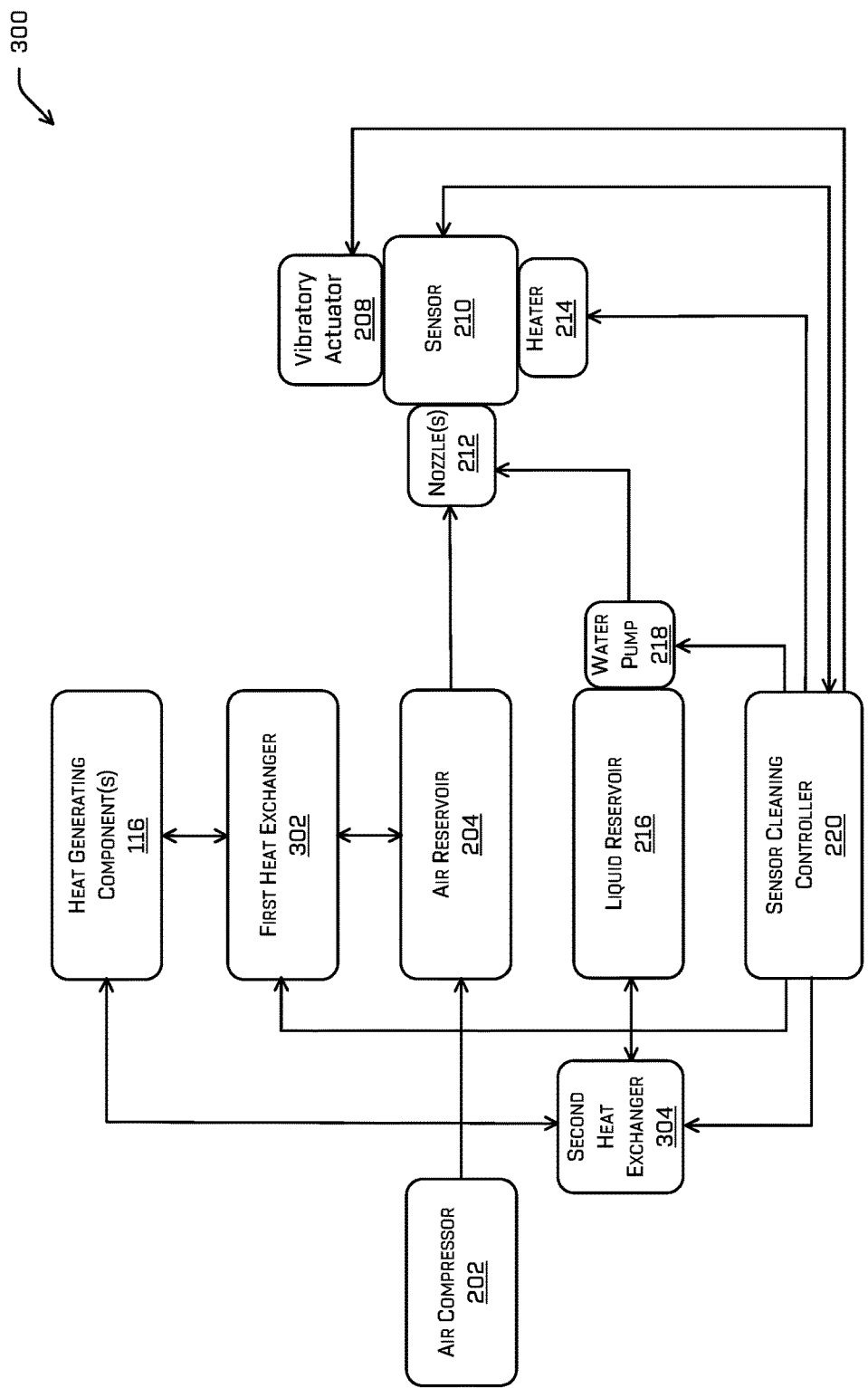
FIG. 3 is a block diagram illustrating another example sensor cleaning architecture, in accordance with the present disclosure.

FIG. 3 is a block diagram illustrating another example sensor cleaning architecture, in accordance with the present disclosure. The sensor cleaning system 300 includes elements similar to the sensor cleaning system 200, as illustrated in FIG. 2, except the sensor cleaning system 300 may include multiple heat exchangers.

In the illustrated example, the sensor cleaning system 300 may include a first heat exchanger 302 coupled to the air reservoir 204 and configured to regulate the temperature of the compressed air stored in the air reservoir 204. The sensor cleaning system 300 may further include a second heat exchanger 304 coupled to the liquid reservoir 216 and configured to regulate the temperature of the liquid stored in the liquid reservoir 216.

In some examples, the sensing surface of the sensor 210 may be covered with frost or ice, the sensor cleaning controller 220 may perform a first mitigating action, such as activating the first heat exchanger 302 to heat the air in the air reservoir 204 and/or activating the water pump 218 to dispense liquid cleaning agent toward the sensor 210 to remove the frost or ice. In some examples, the sensing surface of the sensor 210 may have rain and/or condensation. The sensor cleaning controller 220 may perform a second mitigating action, such as activating the first heat exchanger 302 to heat the air in the air reservoir 204 and dispensing the heated air toward the sensor 210 and/or activating the heater 214 coupled to the sensor 210. In some examples, the sensing surface of the sensor 210 may be covered with obstructions such as dirt and/or contaminant, the sensor cleaning controller 220 may perform a third mitigating action, such as activating the water pump 218 to dispense the liquid cleaning agent toward the sensor 210, activating the vibratory actuator 208, and/or activating other mechanical cleaning element, to remove the obstructions. Depending on the type of the sensor 210, the sensor cleaning controller 220 may pre-configure one or more temperature levels and/or a temperature range, to which the air and/or liquid will be heated for sensor heating and/or cleaning. Alternatively, and/or additionally, the sensor cleaning controller 220 may heat the air and/or liquid to a temperature level and/or within a temperature range based on the temperature of the environment and/or the sensor.

Figure 4:
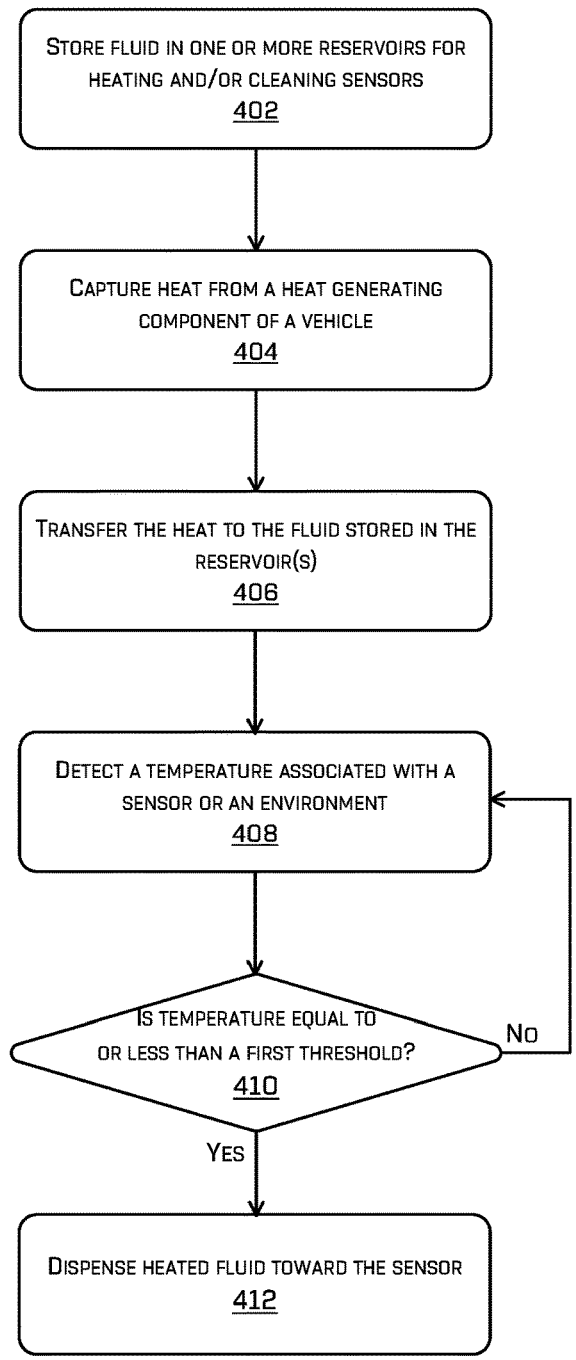
FIG. 4 is a flowchart illustrating an example process of sensor cleaning, in accordance with the present disclosure.

FIG. 4 is a flowchart illustrating an example process of sensor cleaning, in accordance with the present disclosure. The illustrated process 400 may be performed by one or more elements of the sensor cleaning system 200 and/or the sensor cleaning system 300, as illustrated in FIG. 2 and FIG. 3.

At operation 402, the process 400 may include storing fluid in a reservoir for heating and/or cleaning the sensor. As discussed herein, the fluid for heating and/or cleaning may be pre-stored in a reservoir according to a default configuration. By way of example and no limitation, the fluid for heating and/or cleaning may include compressed air, water, alcohol, detergent, etc. The fluid for heating and/or cleaning the sensor may be gradually dissipated or used and needs to be refilled periodically.

In some examples, the pre-stored compressed air and/or liquid cleaning agent are pre-heated before being applied to the surface of a sensor, causing consumption of electrical energy of the vehicle. In instances, the fluid for heating and/or cleaning may be stored in an air reservoir (i.e., the air reservoir 204 in FIGS. 2 and 3), a liquid reservoir (i.e., the liquid reservoir 216 in FIGS. 2 and 3), or any other reservoirs not shown.

At operation 404, the process 400 may include capturing heat from a heat generating component of a vehicle. As discussed herein, one or more components, modules, or systems of the vehicle generate heat while in operation. For example, the computing system uses electrical energy to process data, and generates a large amount of heat. In another example, the HVAC system of the vehicle generates heat. In another example, the powertrain of the vehicle (e.g., one or more electric motors, combustion engines, etc.) generates heat while providing power to drive the vehicle. In yet other examples, a power source, a power regulator, a braking system, surfaces subject to solar load, the charging circuits of the vehicle generate heat while the vehicle is charging.

The heat that would normally otherwise be wasted, is now captured to be used for sensor heating and/or cleaning. By utilizing the waste heat for sensor heating and/or cleaning, the consumption of the electrical energy of the vehicle can be reduced. In instances, the heat generating component of the vehicle may include the heat generating component 116, as shown in FIGS. 2 and 3. The capturing of the heat generated by the heat generating component may be performed by the heat exchanger 118, as shown in FIG. 2, or by the first heat exchanger 302 and the second heat exchanger 304, as shown in FIG. 3, or any other heat capturing structures coupled to the vehicle. In instances, the heat exchanger(s) 119 and the reservoir may be formed integrally and serve to heat and/or clean the sensors.

At operation 406, the process 400 may include transferring the captured heat to heat the fluid stored in the reservoir. In instances, as shown in FIG. 2, the heat exchanger(s) 118 may transfer the captured heat to heat the compressed air stored in the air reservoir 204. The heat exchanger(s) 118 may also transfer the captured heat to heat the liquid fluid stored in the liquid reservoir 216. In some examples, the air reservoir 204 and the liquid reservoir 216 may be coupled to separate heat exchangers. The air reservoir 204 is coupled to the first heat exchanger 302 and the liquid reservoir 216 is coupled to the second heat exchanger 304, as shown in FIG. 3.

In some examples, the heat exchanger may detect the temperature of the fluid stored in the fluid reservoir. The temperature of the fluid stored in the fluid reservoir may need to maintain at a first threshold or within a temperature range. If the fluid temperature is dropped below the first threshold or the lower bound of the temperature range, the heat exchanger may be triggered to capture the heat and apply the heat to heat the fluid stored in the fluid reservoir.

In some other examples, the heat exchanger may be triggered by a sensor cleaning system (i.e., the sensor cleaning controller 220). The sensor cleaning controller 220 may constantly detect the temperature of the environment and/or the various sensors coupled to the vehicle. If the temperature of the environment and/or the various sensors is equal to or less than a second threshold, the sensor cleaning controller 220 may instruct the heat exchanger to supply the captured heat to heat the fluid reservoir for sensor heating. In instances, the sensor cleaning controller 220 may detect an obstruction on a sensing surface of the sensor, the sensor cleaning controller 220 may instruct the heat exchanger to supply the captured heat to heat the fluid reservoir for sensor cleaning. Depending on the temperature of the environment and/or the type of sensor, the sensor cleaning controller 220 may determine a suitable temperature, to which the fluid will be heated for heating and/or cleaning.

At operation 408, the process 400 may include detecting a temperature associated with a sensor or an environment. As described above, the sensor cleaning controller 220 may detect the temperature of the environment and/or the various sensors coupled to the vehicle. In addition to the imaging sensors and ranging sensors, the vehicle may comprise one or more temperature sensors coupled to the outer frame of the vehicle body. The one or more temperature sensors may also be coupled to the sensor pods (i.e., the sensor pod assembly 102A and/or sensor pod assembly 102B, as shown in FIG. 1). The temperature data may be constantly or periodically provided to the sensor cleaning controller 220.

At operation 410, the process 400 may include determining whether the temperature is equal to or less than a first threshold. If it is determined that the temperature is equal to or less than the first threshold, at operation 412, the process 400 may include dispensing the heated air and/or heated liquid toward the sensor. In instances, the sensors may be housed within a sensor pod assembly or individually coupled to the body of the vehicle. The sensor cleaning system may comprise multiple passages to direct the heated air and/or heated liquid to respective sensors. In some examples, the sensor cleaning system may further comprise one or more valves coupled to the multiple passages and/or the fluid reservoirs to regulate the amount of the heated air and/or heated liquid to be applied to the sensors. In some examples, the sensor cleaning system may further comprise one or more other valves coupled the fluid reservoirs to direct the heated air and/or the cleaning fluid to the respective sensors.

If it is determined that the temperature is greater than the first threshold, the operation returns to 408.

Figure 5:
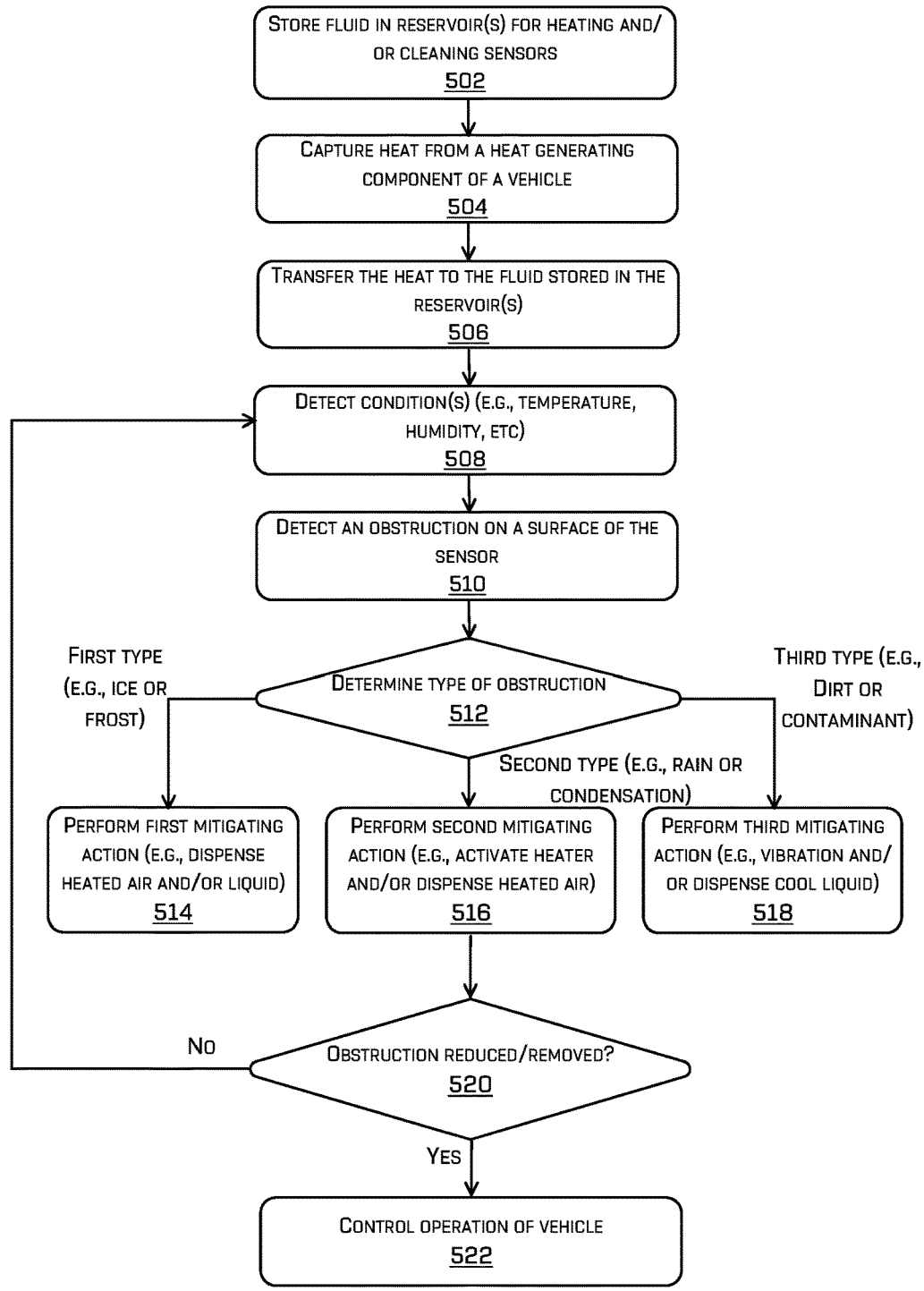
FIG. 5 is a flowchart illustrating another example process of sensor cleaning, in accordance with the present disclosure.

FIG. 5 is a flowchart illustrating an example sensor cleaning process, in accordance with an example of the present disclosure. The illustrated process 500 may be performed by one or more elements of the sensor cleaning system 200 and/or the sensor cleaning system 300, as illustrated in FIG. 2 and FIG. 3.

The operations of 502, 504, and 506 are similar to the operations of 402, 404, and 406, as illustrated in FIG. 4, and therefore, are not detailed herein.

At operation 508, the process 500 may include detecting conditions, such as temperature, humidity, etc. The temperature and/or humidity may be related to the environment or the sensors. In some examples, the sensor cleaning system (i.e., the sensor cleaning controller 220) may periodically receive temperature and/or humidity data from one or more temperature/humidity sensors coupled to the vehicle body and/or the sensor pod assembly.

At operation 510, the process 500 may include detecting an obstruction on a surface of the sensor. As discussed herein, an obstruction on the surface of the sensor may affect the sensing effect. For example, frost, condensation, ice, bird droppings, pulps from trees and plants, or heavy dust from a construction site, may obscure a view angle of a camera. The images taken by the camera may not reflect the true perception of the environment outside the vehicle. In other examples, the obstruction on a ranging sensor (i.e., the LIDAR sensor) may cause inaccurate ranging data measurements.

In instances, the sensor cleaning system (i.e., the sensor cleaning controller 220) may receive data from multiple sensors and determine whether a particular sensor has obstruction stained thereon. For examples, the sensor cleaning controller 220 may receive multiple image frames taken by a first front camera and a second front camera coupled to the first sensor pod assembly 102A. The first front camera and the second front camera may face a same or similar view angle. The sensor cleaning controller 220 may compare different image frames taken by the first front camera and the second front camera and determine whether there are continuous discrepancies between the image taken by different cameras. If the continuous discrepancies between the images exist, the sensor cleaning controller 220 may determine that one of the front cameras may have obstructions on the sensing surface.

Alternatively, or additionally, the image data from multiple sensors may be transmitted to an image analysis module coupled to the vehicle or a remote vehicle. The computing device of the vehicle or the remote vehicle may perform the image analysis and determine whether an obstruction is on the sensing surface. The result of the image analysis is transmitted to the sensor cleaning controller 220 for reference.

At operation 512, the process 500 may include determining a type of the obstruction. In some examples, the frost or ice may be caused by the environment temperature and/or humidity. A thin cover of the frost or ice on the sensing surface of the sensor may obscure the view of the sensor. As the frost generally includes tiny ice crystals formed from the water vapor in the air and the ice is the water frozen into solid state, the frost or ice generates different light transparencies from the dust or dirt stained on the sensing surface. For example, the images taken when obstructed by a thin layer of frost or ice may have lighter shadow than the images taken when obstructed by dirt.

If it is determined that the obstruction is frost or ice, at operation 514, the process 500 may include performing a first mitigating action, such as dispensing the heated air and/or liquid toward the sensor. In instances, the sensor cleaning controller 220 may instruct an air reservoir (i.e., the air reservoir 204 shown in FIGS. 2 and 3) to dispense the compressed air toward the sensor. In some examples, the compressed air is dispensed toward one or mor nozzles coupled to the sensor. In some examples, the sensor cleaning controller 220 may instruct a heat exchanger (i.e., the heat exchanger(s) 118 in FIG. 2, or the first heat exchanger 302 and the second heat exchanger 304 in FIG. 3) to transfer the heat captured from the heat generating components of the vehicle (i.e., the heat generating component 116 in FIG. 2 and FIG. 3) to heat the compressed air before dispensing it for heating and/or cleaning.

In instances, the sensor cleaning controller 220 may determine whether the frost and/or ice is removed after applying the heated air and/or liquid. The sensor cleaning controller 220 may analyze the images taken from the affected sensor and determine whether the view of the sensor is cleared. The sensor cleaning controller 220 may instruct the air reservoir and/or the liquid reservoir to re-apply the heated air until the frost and/or ice is removed. Alternatively, or additionally, the sensor cleaning controller 220 may instruct the liquid reservoir to apply the liquid cleaning agent to remove the frost and/or ice until the frost and/or ice is removed.

If it is determined that the obstruction is rain and/or condensation, at operation 516, the process 500 may include performing a second mitigating action, such as activating the heater and/or dispensing the heated air toward the sensor. In examples, the sensor cleaning controller 220 may determine whether the obstruction is rain and/or condensation based on the temperature and/humidity of the environment.

If it is determined that the obstruction is dirt or contaminant, at operation 518, the process 500 may include performing a third mitigating action, such as activating a vibratory actuator and/or dispensing cool liquid to clean the sensor. In some examples, the sensor cleaning controller 220 may activate the vibratory actuator to vibrate the sensor, the sensor house, the senor mount, etc., to remove the dirt or contaminant. Alternatively, or additionally, the sensor cleaning controller 220 may instruct the liquid reservoir to dispense cool liquid cleaning agent toward the sensor.

At operation 520, the process 500 may include determining whether the obstruction is reduced and/or removed. If it is determined that the obstruction is reduced and/or removed, the process 500 may include controlling operation of the vehicle at operation 522. If it is determined that the obstruction is not reduced and/or removed, the process 500 may return to operation 508. The process 500 may include repeating the operations 510, 512, 514, 516, or 518 until the obstruction is reduced and/or remove.

Figure 6:
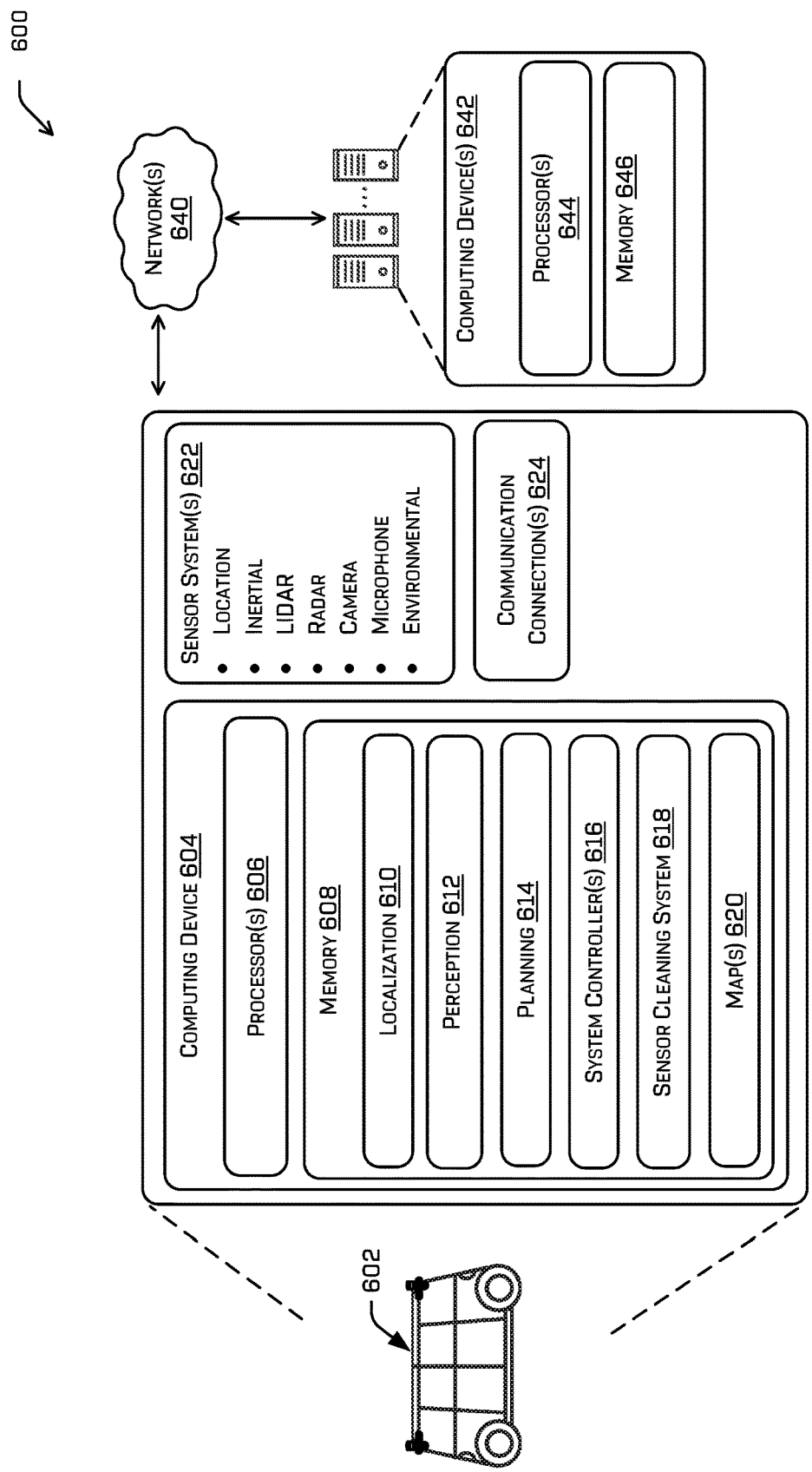
FIG. 6 is a block diagram of an example system for implementing the techniques of FIGS. 2-5.

FIG. 6 is a block diagram of an example system for implementing the techniques of FIGS. 2-5. In the illustrated example, the system 600 can include a vehicle 602, which can be the same vehicle as the vehicle 100 described above with reference to FIG. 1. The vehicle 602 may comprise a computing device 604, which may perform the same or similar functions as the computing system(s) 110 described above with reference to FIG. 1.

In the illustrated example, the vehicle 602 can be any other type of vehicle (i.e., autonomous vehicle or non-autonomous vehicle). The computing device 604 can include one or more processors 606 and memory 608 communicatively coupled with the one or more processors 606. The memory 608 of the computing device 604 stores a localization component 610, a perception component 612, a planning component 614, one or more system controllers 616, and a sensor cleaning system 618. The memory 608 can also store one or more map(s) 620. Though depicted in FIG. 6 as residing in memory 608 for illustrative purposes, it is contemplated that several of the features, including the sensor cleaning system 618, the map(s) 620 and/or other components may additionally, or alternatively, be accessible to the computing device 604 (e.g., residing remotely).

In some example, the localization component 610 may include functionality to receive data from the sensor system(s) 622 to determine a position and/or orientation of the vehicle 602 (e.g., one or more of an x-, y-, z-position, roll, pitch, or yaw). For example, the localization component 610 may include and/or request/receive a map of an environment, such as from map(s) 620, and may continuously determine a location and/or orientation of the vehicle 602 within the map. In some instances, the localization component 610 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 602. In some instances, based on the receive data from the sensor system(s) 622, the localization component 610 may also determine the locations of sensors that need to be heated, cooled, or cleaned. For example, the localization component 610 may determine that a first front camera coupled to the first sensor pod assembly 102A, as illustrated in FIG. 1, needs to be heated to remove the frost or ice on the lens.

In some examples, the perception component 612 may include functionality to perform object detection, segmentation, and/or classification. In some examples, the perception component 612 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 612 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 612 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In some example, the planning component 614 may determine a path for the vehicle 602 to follow to traverse through an environment. For example, the planning component 614 may determine various routes and vehicle trajectories and various levels of detail. For example, the planning component 614 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 614 may generate an instruction for guiding the autonomous vehicle along at least a portion of the route from the first location to the second location. In at least one example, the planning component 614 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some example, the computing device 604 may include one or more system controllers 616, which may be configured to control steering, propulsion, braking, safety, emitters, communication, and other systems of the vehicle 602. The system controller(s) 616 may communicate with and/or control corresponding systems of the drive module(s) and/or other components of the vehicle 602.

In some example, the vehicle 602 may also include one or more communication connection(s) 624 that enable communication between the vehicle 602 and one or more other local or remote computing device(s) 642. The communication connection(s) 624 may allow the vehicle to communicate with other nearby computing device(s) and/or one or more remote sensor system(s) for receiving sensor data. The communications connection(s) 624 may include physical and/or logical interfaces for connecting the computing device 604 to another computing device or a network, such as network(s) 640. For example, the communications connection(s) 624 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some instances, aspects of some or all of the components discussed herein may include any models, algorithms, and/or machine learning algorithms. For example, in some instances, the components in the memory 608 and/or the memory 646 may be implemented as a neural network.

As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 4 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet30, ResNet101, VGG, DenseNet, PointNet, and the like.

In some examples, the sensor cleaning system 618 may be configured to heat, cool, and/or clean the sensors coupled and/or mounted to the vehicle. The sensor cleaning system 618 may perform the same and/or similar functions to the sensor cleaning systems 200 and 300 with respect to FIGS. 2 and 3, as described above. The sensor cleaning system 618 may determine the conditions of the environment based on the sensor data, i.e., the temperature and/or the humidity of the environment. Based on the conditions, the sensor cleaning system 618 may determine that sensor heating, cooling and/or cleaning may be desired. For example, in very cold weather, the sensor cleaning system 618 may apply heated air and/or liquid to heat the sensors and/or remove frost before and/or during operating the vehicle. In another example when the humidity level is high, the sensor cleaning system 618 may apply heated and/or normal temperature air to heat the sensors and/or remove condensation before and/or during operating the vehicle. In yet another example, in a very hot weather, the sensor cleaning system 618 may apply cool air and/or cool liquid to a housing, mount, or other portion of one or more sensors to cool the sensors to avoid overheating. Alternatively, and/or additionally, the sensor cleaning system 618 may determine whether an obstruction is present on the sensing surface of the sensors. The sensor cleaning system 618 may perform various mitigating actions to remove the obstruction. In some stances, the sensor cleaning system 618 may dispense heated air and/or liquid from an air reservoir and/or a liquid reservoir (e.g., the air reservoir 204 and the liquid reservoir 216 in FIGS. 2 and 3) via one or more nozzle(s) coupled to or directed toward the sensor(s). In some stances, the sensor cleaning system 618 may dispense heated air and/or activate a heater to heat the sensors. In other instances, the sensor cleaning system 618 may dispense cool liquid and/or activate a vibratory actuator to remove the obstruction. It should be understood that the various mitigating actions may be performed singly or in combination, depending on the conditions of the environment, the conditions of the sensors, the type of sensors, the type of obstruction, and/or the materials that the sensors are made of etc. The temperature of the heated air, heated liquid, and/or the cool liquid may be pre-determined and stored by the sensor cleaning system 618 for used depending on the conditions. The sensor cleaning system 618 may set multiple temperatures and/or multiple temperature ranges corresponding to different conditions, different obstructions, different sensors, and/or different materials.

The map(s) 620 can be used by the computing device 604 to determine a location and/or navigate within the environment, when, for example, the platform is a vehicle. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In some examples, the map(s) 620 can include at least one map (e.g., images and/or a mesh). The map(s) 620 can be used in connection with the localization component 610, the perception component 612, and the planning component 614 to determine a location of the vehicle 602, identify objects in an environment, and/or generate routes and/or trajectories to navigate within an environment.

In some example, the sensor system(s) 622 can include LIDAR sensors, radar sensors, time-of-flight sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 622 can include multiple instances of each of these or other types of sensors. For instance, the LIDAR sensors (and/or radar sensors) can include individual LIDAR sensors (or radar sensors) located at the corners, front, back, sides, and/or top of the sensor pod. As another example, the camera sensors can include multiple cameras disposed at various locations about the exterior and/or interior of the sensor pod. The sensor system(s) 622 can provide input to the computing device 604. Additionally, or alternatively, the sensor system(s) 622 can send sensor data, via one or more networks 640, to one or more remote computing devices at a particular frequency, after a lapse of a predetermined period of time, in near real-time, etc.

In some examples, the sensor system(s) 622 can be active sensor systems, e.g., that include controls for actively adjusting parameters thereof. For example, some cameras may have adjustable shutter speed or exposure time. Similarly, time-of-flight sensors, LiDAR sensors, radar sensors, and the like may have actively adjustable intensity and/or gain attributes. In some implementations, the semantic segmentation information may be further used to adjust one or more settings of the sensor. For example, when the semantic segmentation information identifies a certain class of type of object in the environment of a sensor, the sensor can be adjusted to optimize sensing of that object. For instance, when certain objects that are expected to have an expected color or brightness are identified from the semantic segmentation information, the intensity of emitted light can be adjusted to optimize sensing.

The processor(s) 606 of the computing device 604 can be any suitable processor capable of executing instructions to process data and perform operations as described herein. By way of example and not limitation, the processor(s) 606 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 608 is an example of non-transitory computer-readable media. The memory 608 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

While FIG. 6 is illustrated as a distributed system, in alternative examples, components of the system can be associated with remote computing devices accessible via the network(s) 640. For example, the computing device 604 can send sensor data to one or more computing device(s) 642, via the network(s) 640. In some examples, the computing device 604 can send raw sensor data to the computing device(s) 642. In other examples, the computing device 604 can send processed sensor data and/or representations of sensor data to the computing device(s) 642. In some examples, the computing device 604 can send sensor data to the computing device(s) 642 at a particular frequency, after a lapse of a predetermined period of time, in near real-time, etc. In some cases, the computing device 604 can send sensor data (raw or processed) to the computing device(s) 642 as one or more log files.

The one or more other local or remote computing device(s) 642 may have similar configuration as the computing device 604. For example, the remote computing device(s) 642 may include one or more processor(s) 644 and a memory 646 that stores various components and/or modules related to the operation of the vehicles. The computing device(s) 642 can receive the sensor data (raw or processed) and can perform various operations on the data.

EXAMPLE CLAUSES

Any of the example clauses in this section may be used with any other of the example clauses and/or any of the other examples described herein.

A: A vehicle comprising: a power train configured to propel the vehicle, the power train generating heat; a sensor coupled to an exterior of the vehicle, the sensor configurated to sense an environment of the vehicle; and a sensor cleaning system configured to clean the sensor with a fluid, the sensor cleaning system comprising: a reservoir configured to store the fluid to be used to clean the sensor; a heat exchanger configured to apply heat generated by the power train to heat the fluid in the reservoir to generate heated fluid; and a dispenser fluidly coupled to the reservoir and configured to dispense the heated fluid toward the sensor to at least one of clean or heat the sensor.

B: The vehicle of paragraph A, further comprising one or more processors and memory storing instructions that, when executed, configure the vehicle to perform operations comprising: detecting a temperature, the temperature being associated with at least one of the sensor or the environment; and based at least in part on the temperature being equal to or less than a first threshold, performing operations including at least one of: regulating a second temperature of the fluid in the reservoir, or dispensing the heated fluid toward the sensor.

C: The vehicle of paragraph A, wherein the reservoir comprises a first reservoir and the heated fluid comprises a heated liquid cleaning agent, the vehicle further comprising: a second reservoir for storing compressed air; and an air compressor to compress air for storage in the second reservoir, wherein the heat exchanger or another heat exchanger is configured to apply the heat generated by the power train to the compressed air in the second reservoir.

D: The vehicle of paragraph C, further comprising one or more processors and memory storing instructions that, when executed, configure the vehicle to perform operations comprising: detecting an obstruction of the sensor; determining a type of the obstruction; and determining, based at least in part on the type of the obstruction, a mitigating action to perform, the mitigating action comprising at least one of: dispensing the heated liquid cleaning agent toward the sensor, or dispensing heated compressed air toward the sensor.

E: A method of cleaning a sensor of a vehicle, the method comprising: storing a cleaning fluid in a reservoir; capturing heat from a heat generating component of the vehicle, wherein the heat generating component performs a function other than the heat generating; transferring the heat captured from the heat generating component to the cleaning fluid in the reservoir to provide heated cleaning fluid; and dispensing the heated cleaning fluid onto a surface of the sensor of the vehicle to at least one of clean or heat the sensor.

F: The method of paragraph E, wherein the heat comprises waste heat from the heat generating component, and the heat generating component comprises at least one of: a computing system of the vehicle; a heating ventilation air conditioning (HVAC) system of the vehicle; a component of a powertrain of the vehicle; a power source of the vehicle; a power regulator of the vehicle; a braking system of the vehicle; surfaces of the vehicle subject to solar load; or a charging system of the vehicle.

G: The method of paragraph E, further comprising: detecting a temperature, the temperature being associated with at least one of the sensor or an environment; and based at least in part on the temperature being equal to or less than a first threshold, performing operations including at least one of: regulating a second temperature of the cleaning fluid in the reservoir, or causing the dispensing of the heated cleaning fluid onto the surface of the sensor.

H: The method of paragraph E, the method further comprising: compressing and storing air in a second reservoir to generate compressed air; transferring at least a portion of the heat captured from the heat generating component to the second reservoir to provide heated compressed air; and dispensing the heated compressed air toward the sensor.

I: The method of paragraph H, further comprising: detecting an obstruction of the sensor; determining a type of the obstruction; and determining, based at least in part on the type of the obstruction, a mitigating action to perform, the mitigating action comprising at least one of: a first mitigating action comprising dispensing the heated cleaning fluid toward the sensor, or a second mitigating action comprising dispensing the heated compressed air toward the sensor.

J: The method of paragraph I, further comprising: detecting a condition associated with at least one of the sensor or an environment in which the vehicle operates, wherein determining the mitigating action to perform is further based at least in part on the condition.

K: The method of paragraph E, further comprising: cooling the cleaning fluid in the reservoir or an additional reservoir using a cooling system of the vehicle.

L: A system comprising: a sensor configured to sense an environment of the system; a heat generating component, wherein the heat generating component performs a function other than the heat generating; and a sensor cleaning system configured to clean the sensor with a fluid, the sensor cleaning system comprising: a reservoir to store the fluid to be used to clean the sensor: a heat exchanger to apply heat generated by the heat generating component to heat the fluid in the reservoir to generate heated fluid; and a dispenser fluidly coupled to the reservoir and configured to dispense the heated fluid toward the sensor to clean the sensor.

M: The system of paragraph L, wherein the reservoir and the heat exchanger are formed integrally and configured to heat the fluid in the reservoir.

N: The system of paragraph L, wherein the heat exchanger is further configured to regulate a second temperature of the fluid in the reservoir based at least in part on one or more materials of the sensor, toward which the heated fluid is to be dispensed.

O: The system of paragraph L, wherein the heat generating component comprises a first heat generating component, and wherein the heat comprises waste heat from the first heat generating component and a second heat generating component.

P: The system of paragraph L, wherein the heat comprises waste heat, and the heat generating component comprises at least one of: a computing system of a vehicle; a heating ventilation air conditioning (HVAC) system of the vehicle; a component of a powertrain of the vehicle; a power source of the vehicle; a power regulator of the vehicle; a braking system of the vehicle; surfaces of the vehicle subject to solar load: or a charging system of the vehicle.

Q: The system of paragraph L, wherein the heat generating component is further configured to perform operations comprising: detecting a temperature, the temperature being associated with at least one of the sensor or the environment; and based at least in part on the temperature being equal to or less than a first threshold, performing operations including at least one of: regulating a second temperature of the fluid in the reservoir, or dispensing the heated fluid toward the sensor.

R: The system of paragraph L, wherein the reservoir comprises a first reservoir and the heated fluid comprises a heated liquid cleaning agent, the system further comprising: a second reservoir for storing compressed air; and an air compressor to compress air for storage in the second reservoir, wherein the heat exchanger or another heat exchanger is configured to apply heat generated by the heat generating component to the compressed air in the second reservoir to generate heated compressed air.

S: The system of paragraph L, wherein the system is further configured to perform operations comprising: detecting an obstruction of the sensor; determining a type of the obstruction; and determining, based at least in part on the type of the obstruction, a mitigating action to perform, the mitigating action comprising at least one of: a first mitigating action comprising dispensing the heated liquid cleaning agent toward the sensor, or a second mitigating action comprising dispensing the heated compressed air toward the sensor.

T: The system of paragraph L, wherein the system is further configured to perform operations comprising: detecting an obstruction of the sensor; determining a type of the obstruction; and determining, based at least in part on the type of the obstruction, a mitigating action to perform, the mitigating action comprising at least one of: a first mitigating action comprising dispensing the heated fluid toward the sensor, or a second mitigating action comprising refraining from dispensing the heated fluid toward the sensor.

U: The system of paragraph T, wherein the sensor cleaning system is further configured to perform operations comprising: cooling the fluid in the reservoir or an additional reservoir using a cooling loop of the system to obtain cool fluid.

V: The system of paragraph U, wherein the second mitigating action comprises dispensing the cool fluid toward the sensor.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method of cleaning a sensor of a system, the method comprising:
    storing a fluid in a reservoir;
    capturing heat from a heat generating component of the system, wherein the heat generating component performs a function other than the heat generating and includes a computing system that is configured to process data captured by the sensor and to control an operation of a vehicle;
    transferring the heat captured from the heat generating component to a heat exchanger to apply the heat captured from the heat generating component to heat the fluid in the reservoir and to divert the fluid to a radiator portion of the system to cool the fluid;
    dispensing the fluid onto a surface of the sensor to at least one of clean or heat the sensor; and
    detecting an obstruction of the sensor;
    determining a type of the obstruction is rain; and
    determining, based at least in part on the type of the obstruction of the sensor being rain, a mitigating action to dispense the fluid toward the sensor.

2. The method of claim 1, further comprising:
    detecting a temperature, the temperature being associated with at least one of the sensor or an environment; and
    based at least in part on the temperature being equal to or less than a first threshold, performing operations including at least one of:
        regulating a second temperature of the fluid in the reservoir, or
        causing the dispensing of the fluid onto the surface of the sensor.

3. The method of claim 1, the method further comprising:
    compressing and storing air in a second reservoir to generate compressed air;
    transferring at least a portion of the heat captured from the heat generating component to the second reservoir to provide heated compressed air; and
    dispensing the heated compressed air toward the sensor.

4. The method of claim 3, further comprising:
    determining the type of the obstruction includes dirt; and
    determining, based at least in part on the type of the obstruction including dirt, the mitigating action to perform, the mitigating action comprising:
        dispensing the fluid toward the sensor.

5. The method of claim 4, further comprising:
    detecting a condition associated with at least one of the sensor or an environment in which the system operates,
    wherein determining the mitigating action to perform is further based at least in part on the condition.

6. The method of claim 1, further comprising:
    cooling the fluid in the reservoir or an additional reservoir using a cooling system of the system.

7. A system comprising:
    a sensor configured to sense an environment of the system;
    a heat generating component, wherein the heat generating component includes a computing system of a vehicle that is configured to process data captured by the sensor and to control an operation of the vehicle;
    a sensor cleaning system configured to clean the sensor with a fluid, the sensor cleaning system comprising:
        a reservoir to store the fluid to be used to clean the sensor;
        a heat exchanger to apply heat generated by the heat generating component to heat the fluid in the reservoir to generate heated fluid, and to divert the fluid to a radiator portion of the sensor cleaning system to cool the fluid; and
        a dispenser fluidly coupled to the reservoir and configured to dispense the heated fluid toward the sensor to clean the sensor, and
    one or more processors and memory storing instructions that, when executed by the one or more processors, configure the system to perform operations comprising:
        detecting an obstruction of the sensor,
        determining a type of the obstruction is rain, and
        determining, based at least in part on the type of the obstruction of the sensor being rain, a mitigating action to dispense the heated fluid toward the sensor.

8. The system of claim 7, wherein the reservoir and the heat exchanger are formed integrally in an integral unit of the sensor cleaning system.

9. The system of claim 7, wherein the heat exchanger is further configured to regulate a second temperature of the fluid in the reservoir based at least in part on one or more materials of the sensor, toward which the heated fluid is to be dispensed.

10. The system of claim 7, wherein the heat generating component comprises a first heat generating component, and wherein the heat comprises waste heat from the first heat generating component and a second heat generating component.

11. The system of claim 7, wherein the heat comprises waste heat, and the heat generating component comprises at least one of:
    a heating ventilation air conditioning (HVAC) system of the vehicle;
    a component of a powertrain of the vehicle;
    a power source of the vehicle;
    a power regulator of the vehicle;
    a braking system of the vehicle;
    surfaces of the vehicle subject to solar load; or
    a charging system of the vehicle.

12. The system of claim 7, wherein the heat generating component is further configured to perform operations comprising:
    detecting a temperature, the temperature being associated with at least one of the sensor or the environment; and
    based at least in part on the temperature being equal to or less than a first threshold, performing operations including at least one of:

regulating a second temperature of the fluid in the reservoir, or dispensing the heated fluid toward the sensor.

13. The system of claim 7, wherein the reservoir comprises a first reservoir and the heated fluid comprises a heated liquid cleaning agent, the system further comprising:

a second reservoir for storing compressed air; and an air compressor to compress air for storage in the second reservoir, wherein the heat exchanger or another heat exchanger is configured to apply heat generated by the heat generating component to the compressed air in the second reservoir to generate heated compressed air.

14. The system of claim 13, wherein the system is further configured to perform operations comprising:

determining the type of the obstruction includes dirt; and determining, based at least in part on the type of the obstruction including dirt, the mitigating action to perform, the mitigating action comprising dispensing the heated liquid cleaning agent toward the sensor.

15. The system of claim 7, wherein the system is further configured to perform operations comprising:

determining the type of the obstruction includes dirt; and determining, based at least in part on the type of the obstruction including dirt, a mitigating action to perform, the mitigating action comprising at least one of:

a first mitigating action comprising vibrating the sensor, or a second mitigating action comprising refraining from dispensing the heated fluid toward the sensor.

16. The system of claim 8, wherein the sensor cleaning system further includes a sensor cleaning controller configured to pre-set a temperature range, to which the fluid is to be heated to clean the sensor, and the heat exchanger regulates the temperature of the fluid in the reservoir by applying heat generated by the heat generating component to heat the fluid to be within the temperature range.

17. A system comprising:

a sensor configured to sense an environment of the system;

a heat generating component, wherein the heat generating component performs a function other than the heat generating;

a sensor cleaning system configured to clean the sensor with a fluid, the sensor cleaning system comprising:

an integral unit including at least a reservoir to store the fluid to be used to clean the sensor, a heat exchanger, and a radiator portion, wherein the heat exchanger is formed integrally with the reservoir and configured to regulate a temperature of the fluid by:

applying heat generated by the heat generating component to heat the fluid in the reservoir to generate heated fluid, and diverting the fluid to the radiator portion to cool the fluid; and a dispenser fluidly coupled to the reservoir and configured to dispense the heated fluid toward the sensor to clean the sensor, and one or more processors and memory storing instructions that, when executed by the one or more processors, configure the system to perform operations comprising:

detecting an obstruction of the sensor, determining a type of the obstruction includes dirt, and determining, based at least in part on the type of the obstruction of the sensor including dirt, a mitigating action to perform, the mitigating action comprising at least one of:

a first mitigating action comprising vibrating the sensor, or a second mitigating action comprising refraining from dispensing the heated fluid toward the sensor.

18. The system of claim 17, wherein the heat exchanger is further configured to regulate the temperature of the fluid in the reservoir based at least in part on one or more materials of the sensor, toward which the heated fluid is to be dispensed.

19. The system of claim 17, wherein the heat generating component comprises a first heat generating component, and wherein the heat comprises waste heat from the first heat generating component and a second heat generating component.

20. The system of claim 17, wherein the heat comprises waste heat, and the heat generating component comprises at least one of:

a computing system of a vehicle;

a heating ventilation air conditioning (HVAC) system of the vehicle;

a component of a powertrain of the vehicle;

a power source of the vehicle;

a power regulator of the vehicle;

a braking system of the vehicle;

surfaces of the vehicle subject to solar load; or a charging system of the vehicle.

* * * * *